ized debit card. The debit card is associated with a bank
United States Patent Berry et al.

(10) Patent No.: US 11,556,905 B2
(45) Date of Patent: Jan. 17, 2023

(54) SYSTEM AND METHOD FOR REMOTE ACCESS

(71) Applicant: Walmart Apollo, LLC, Bentonville, AR (US)

(72) Inventors: Charles D. Berry, Fayetteville, AR (US); Timothy Webb, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 452 days.

(21) Appl. No.: 15/188,001

(22) Filed: Jun. 21, 2016

(65) Prior Publication Data

US 2016/0371659 A1 Dec. 22, 2016

Related U.S. Application Data

(60) Provisional application No. 62/183,011, filed on Jun. 22, 2015.

(51) Int. Cl.
*G06Q 20/04* (2012.01)
*G07F 19/00* (2006.01)
(Continued)

(52) U.S. Cl.
CPC ......... *G06Q 20/042* (2013.01); *G06Q 20/027* (2013.01); *G06Q 20/108* (2013.01);
(Continued)

(58) Field of Classification Search
CPC .... G06Q 20/10; G06Q 20/027; G06Q 20/108; G06Q 20/202; G06Q 20/26;
(Continued)

(56) References Cited

U.S. PATENT DOCUMENTS 6,000,608 A 12/1999 Dorf
6,473,500 B1 10/2002 Risafi et al.
(Continued)

OTHER PUBLICATIONS https://dfi.wa.gov/financial-education/information/debit-cards-frequently-asked-questions (Year: 2006).*
(Continued)

*Primary Examiner* — Neha Patel
*Assistant Examiner* — Yin Y Choi
(74) *Attorney, Agent, or Firm* — Fitch, Even, Tabin & Flannery, LLP

(57) ABSTRACT

A technique for remote access via a computing device is discussed. In one embodiment, a computing device receives data indicative of a card number associated with a bank-issued debit card. The debit card is associated with a bank account at a bank that issued the bank-issued debit card. The computing device also receives data indicative of an amount of cash to be deposited into the account based on an amount of cash provided at the computing device location. Encrypted data indicative of the card number and the data indicative of the amount of cash is routed to a gateway vendor server and is further routed to a payment network server for deposit of an amount corresponding to the data indicative of the amount of cash into the bank account associated with the card number.

18 Claims, 8 Drawing Sheets

(51) Int. Cl.
*G06Q 20/02* (2012.01)
*G06Q 20/20* (2012.01)
*G06Q 20/26* (2012.01)
*G06Q 20/40* (2012.01)
*G06Q 20/10* (2012.01)

(52) U.S. Cl.
CPC ........... *G06Q 20/202* (2013.01); *G06Q 20/26* (2013.01); *G06Q 20/4016* (2013.01); *G07F 19/202* (2013.01); *G06Q 2220/00* (2013.01)

(58) Field of Classification Search
CPC ........... G06Q 20/4016; G06Q 2220/00; G06Q 20/042; G07F 19/202
USPC .......................................................... 705/79
See application file for complete search history.

(56) References Cited

U.S. PATENT DOCUMENTS

| | | | |
|---|---|---|---|
| 7,127,426 | B1 | 10/2006 | Coyle |
| 8,146,805 | B1* | 4/2012 | Davis et al. |
| 8,775,310 | B2 | 7/2014 | Tanner et al. |
| 9,836,727 | B1* | 12/2017 | Bennan et al. |
| 10,380,565 | B1* | 8/2019 | Prasad |
| 2005/0080737 | A1* | 4/2005 | Stein et al. |
| 2005/0108168 | A1* | 5/2005 | Halpin et al. |
| 2005/0178030 | A1* | 8/2005 | Smith |
| 2005/0289030 | A1 | 12/2005 | Smith |
| 2006/0074803 | A1 | 4/2006 | Crowell et al. |
| 2007/0100750 | A1 | 5/2007 | Hartfield et al. |
| 2008/0301047 | A1* | 12/2008 | Fish et al. |
| 2009/0157520 | A1* | 6/2009 | Algiene et al. |
| 2009/0171795 | A1* | 7/2009 | Clouthier et al. |
| 2012/0130887 | A1* | 5/2012 | Meckling |
| 2013/0297516 | A1* | 11/2013 | Mampaey |
| 2015/0052054 | A1* | 2/2015 | Tanba |
| 2017/0278183 | A1* | 9/2017 | Snapp .................... G06Q 40/02 |

OTHER PUBLICATIONS

"How to Add Money—T-Mobile Visa Prepaid Card," copyright 2014, available at https://t-mobilemoneyservices.com/How-It-Works/Add-Money, last accessed Apr. 20, 2015.

Michael Gardon, "Amex Serve and Paypal Prepaid offer the most flexibility," available at http://www.thesimpledollar.com/best-prepaid-debit-cards/, created on Mar. 18, 2014, last updated Feb. 26, 2015.

"NetSpend Premier," Reviews, available at http://prepaid-debit-cards-review.toptenreviews.com/netspend-review.html, last accessed Apr. 20, 2015.

"RushCard—It Pays to Believe in Yourself," available at https://www.rushcard.com/, last accessed Apr. 20, 2015.

Combined Search and Examination Report for GB 1610817.1 dated Dec. 6, 2016, pp. 1-7.

U.S. Appl. No. 15/188,011, filed Jun. 21, 2016, Pending, 114826-75802.

* cited by examiner

SYSTEM AND METHOD FOR REMOTE ACCESS

RELATED APPLICATION

This application claims priority to U.S. Provisional Patent Application No. 62/183,011 filed on Jun. 22, 2015, which is hereby incorporated by reference in its entirety.

BACKGROUND

Most people have bank accounts to manage their monetary assets. Banks and financial institutions typically issue a debit card to account holders to enable consumers to access their bank accounts. Generally, consumers visit a bank branch or bank location to directly deposit funds into their bank accounts using a debit card.

SUMMARY

In one embodiment, a method for remote access is provided. The method includes receiving, at a computing device, data indicative of a card number associated with a bank-issued debit card. The debit card is associated with a bank account at a bank that issued the bank-issued debit card. The method also includes receiving data indicative of an amount of cash to be deposited into the account based on an amount of cash provided at the computing device location, and encrypting the data indicative of the card number associated with the bank-issued debit card. The method further includes routing, via the computing device, the encrypted data indicative of the card number and the data indicative of the amount of cash to a gateway vendor server. The routing of the data is based on at least one digit of the card number. The gateway vendor routes the encrypted data indicative of the card number and the data indicative of the amount of cash to a payment network server for deposit of the amount indicated by the data into the bank account associated with the card number.

In another embodiment, a system for remote access is provided. The system includes a computing device module that is configured to receive data indicative of a card number associated with a bank-issued debit card, where the debit card is associated with a bank account at a bank that issued the bank-issued debit card. The computing device module is further configured to receive an amount of cash to be deposited into the account based on an amount of cash provided at the computing device location, encrypt the data indicative of the card number associated with the bank-issued debit card to provide encrypted data indicative of the card number, and route the encrypted data indicative of the card number and data indicative of the amount of cash to a gateway vendor server. The routing is defined based on at least one digit of the card number. The gateway vendor server routes the encrypted data indicative of the card number and the data indicative of the amount of cash to a payment network server for deposit of the amount indicated by the data into the bank account associated with the card number.

In yet another embodiment, a non-transitory machine readable medium storing instructions executable by a processing device, where execution of the instructions causes the processing device to implement a method for remote access. The method includes receiving, at a computing device, data indicative of a card number associated with a bank-issued debit card. The debit card is associated with a bank account at a bank that issued the bank-issued debit card. The method also includes receiving data indicative of an amount of cash to be deposited into the account based on an amount of cash provided at the computing device location, and encrypting the data indicative of the card number associated with the bank-issued debit card. The method further includes routing, via the computing device, the encrypted data indicative of the card number and the data indicative of the amount of cash to a gateway vendor server. The routing of the data is based on at least one digit of the card number. The gateway vendor routes the encrypted data indicative of the card number and the data indicative of the amount of cash to a payment network server for deposit of the amount indicated by the data into the bank account associated with the card number.

BRIEF DESCRIPTION OF DRAWINGS

Some embodiments are illustrated by way of example in the accompanying drawings and should not be construed to limit the present disclosure.

DETAILED DESCRIPTION

Figure 1:
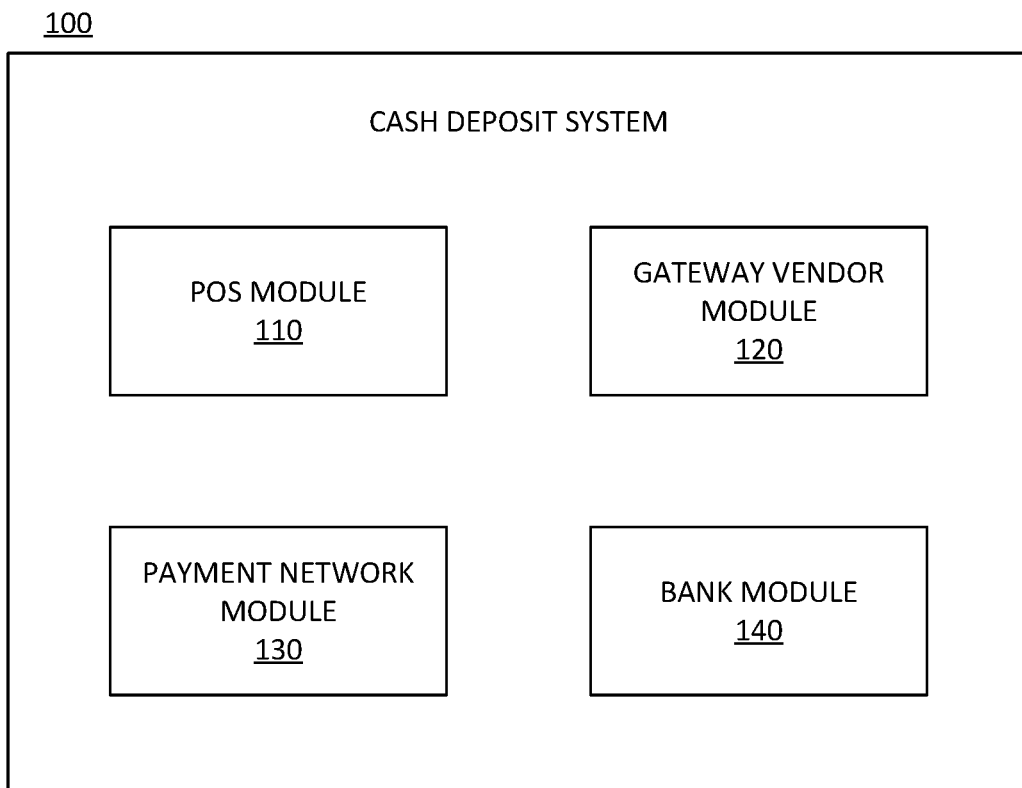
FIG. 1 is a block diagram showing a cash deposit system implemented in modules, according to an example embodiment.

Described in detail herein are methods, systems, and computer readable medium for depositing cash into a bank account using a point-of-sale terminal in a retail store. Example embodiments provide for receiving data indicative of a card number associated with a bank-issued debit card, where the debit card is associated with a bank account at a bank that issued the bank-issued debit card, receiving data indicative of the amount of cash to be deposited into the account based on an amount of cash provided at the point-of-sale terminal, encrypting the data to provide encrypted data indicative of the card number, routing the encrypted data indicative of the card number and the data indicative of the amount of cash to a gateway vendor server, and comparing the card number to a first plurality of stored card numbers to determine whether the card number exists in the gateway vendor database. Exemplary embodiments further provide, in response to determining a match between the card number and a first stored card number of the first plurality of stored card numbers in a gateway vendor database, routing the card number and the data indicative of the amount of cash to a payment network server, comparing the card number to a second plurality of stored card numbers to determine whether the card number exists in the payment network database, and in response to determining a match between the card number and a second stored card number of the second plurality of stored card numbers in a payment network database, routing the card number and the data indicative of the amount of cash to a bank server associated with the bank that issued the bank-issued debit card. Further example embodiments provide for processing a transaction depositing the amount indicated by the data into the bank account associated with the card number.

The systems and methods described herein provide for a funds transfer solution that allows customers with bank accounts to add cash to their bank account by swiping their bank-issued debit card at any register in a retail store. The systems and methods described herein are bank agnostic. That is, the example systems herein can be implemented using an account at any bank or financial institution that participates in the system can participate in the cash deposit system. Customers affiliated with participating banks can simply swipe their debit card, provide the cash at the point-of-sale system at the retail store, and have the funds deposited in their bank account.

Generally, consumers have to visit a bank branch or bank location to directly deposit funds into their bank accounts using a debit card which may not always be convenient due to the limited number of bank locations. Additionally, consumers with bank accounts at internet/online banks, community banks, credit unions or regional banks also need an alternative way to deposit cash into their bank accounts when the bank branch is not convenient to visit or it is closed. Due to the recent economic downturn, many banks and financial institutions have closed their physical branches and reduced the number of new branches being opened. The cash deposit system described herein allows for customers to skip a trip to the bank, which may not be conveniently located or may not be open when the customer wants to deposit cash into his or her account.

A point-of-sale (POS) terminal, as used herein, may be a computing device equipped with a processor and refers to a terminal or a system located in a retail store or associated with a retail store, where a customer can, for example, complete a checkout transaction to purchase one or more items from the retail store. The POS terminal may also be referred to herein as a POS system, a POS register, cash register, and the like.

A third-party vendor, as used herein, refers to various vendors, other than the retail store, that aid in performing transactions using a bank-issued debit card.

A gateway vendor, as used herein, refers to an entity, a company unit, or a company that provides connectivity to multiple endpoints for processing financial transactions. The gateway vendor allows to establish a secure connection to a subset of payment networks. Examples of gateway vendors are, but not limited to, Green Dot Corp., First Data Corp., Interactive Communications International, Inc., Vantiv Inc., MoneyGram International Inc., Ria Money Transfer, and the like.

A payment network, as used herein, refers to an entity, a company unit, or company that provides processing services for retailers and banks to effectuate point-of-sale transactions on behalf of consumers. The payment network allows to establish a secure connection to a subset of banks. Examples of payment networks are, but not limited to, NYCE Payment Network, LLC, STAR Network, MasterCard Inc., Visa Inc., Discover, American Express Co., and the like.

A bank, as used herein, refers to a financial institution that provides various banking services to consumers, such as, maintaining a bank account, depositing funds into a bank account, withdrawing funds from a bank account, issuing a debit card associated with a bank account, and the like. A bank may have physical locations, or it may be a virtual bank (an online bank).

A bank-issued debit card, as used herein, refers to a debit card issued by a bank or a financial institution that provides electronic access to a bank account maintained by the issuing bank or financial institution. A bank-issued debit card, as used herein, is different than a prepaid debit card, or a reloadable gift card. A bank-issued debit card is associated with a bank account, and is backed by a checking account at a bank. In contrast, a prepaid debit card or a reloadable gift card is not backed by a checking account at a bank. In one embodiment, the entity issuing and managing the account corresponding to the bank-issued debit card is different than the entity that is in control of or provides the point-of-sale system.

The following description is presented to enable any person skilled in the art to create and use a computer system configuration and related method and article of manufacture to deposit cash into a bank account at a point-of-sale terminal. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

FIG. 1 is a block diagram 100 showing a cash deposit system in terms of modules according to an example embodiment. The modules may be implemented in device 710 shown in FIG. 7 The modules include a point-of-sale (POS) module 110, gateway vendor module 120, payment network module 130, and bank module 140. The modules may include various circuits, circuitry and one or more software components, programs, applications, apps or other units of code base or instructions configured to be executed by one or more processors included in device 710. In other embodiments, one or more of modules 110, 120, 130, 140 may be included in servers 720, 730, 740 shown in FIG. 7, while other of the modules 110, 120, 130, 140 may be provided in the device 710. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 700 shown in FIG. 7, such as database(s) (e.g., POS database(s) 715, gateway vendor database(s) 725, payment network database(s) 735), servers (e.g., gateway vendor server 730, payment network server 730, bank server 740), or device (e.g., device 710).

The POS module 110 is configured to manage and analyze data received at a POS terminal in a retail store. For example, the POS module 110 may be configured to analyze data indicative of a card number, and route the data to an appropriate gateway vendor server or module. The POS module 110 may compare the card number with a plurality of stored card numbers to retrieve data indicative of a gateway vendor associated with the card number. The POS module 110 may also be configured to encrypt data related to the card number and the amount of cash. In an example embodiment, the POS module 110 may be included at a POS system (for example device 710 discussed in relation with FIG. 7) in a retail store. In an alternative embodiment, the POS module 110 may be included in a server (for example POS server 712) associated with the POS terminal or the retail store, and data received at a POS terminal in the retail store is communicated to the server.

The gateway vendor module 120 is configured to manage and analyze data received from the POS module 110 including data indicative of the card number and the amount of cash. For example, the gateway vendor module 120 may be configured to compare the card number with a plurality of stored card numbers, and route the data to an appropriate payment network server or module. In an example embodiment, the gateway vendor module 120 may be included in a gateway vendor server (for example gateway vendor server 720 discussed in relation to FIG. 7) associated with a gateway vendor. In an alternative embodiment, the gateway vendor module 120 may be included in a user device (for example device 710 of FIG. 7), along with the POS module 110.

The payment network module 130 is configured to manage and analyze data received from the gateway vendor module 120 including data indicative of the card number and the amount of cash. For example, the payment network module 130 may be configured to compare the card number with a plurality of stored card numbers, and route the data to an appropriate bank server or bank module, or a third-party processing center employed by the bank that issued the debit card. In an example embodiment, the payment network module 130 may be included in a payment network server (for example payment network server 730 discussed in relation to FIG. 7) associated with a payment network. In an alternative embodiment, the payment network module 130 may be included in a user device (for example device 710 of FIG. 7), along with the POS module 110 and/or the gateway vendor module 120.

The bank module 140 is configured to manage and analyze data received from the payment network module 130. For example, the bank module 140 may be configured to process a deposit transaction based on the card number and the amount of cash indicated in the received data. In an example embodiment, the bank module 140 may be included in a bank server (for example bank server 740 discussed in relation to FIG. 7) associated with the bank that issued the debit card. In an alternative embodiment, the bank module 140 may be included in a user device (for example device 710 of FIG. 7), along with one or more of the POS module 110, the gateway vendor module 120, and/or the payment network module 130.

Figure 2:
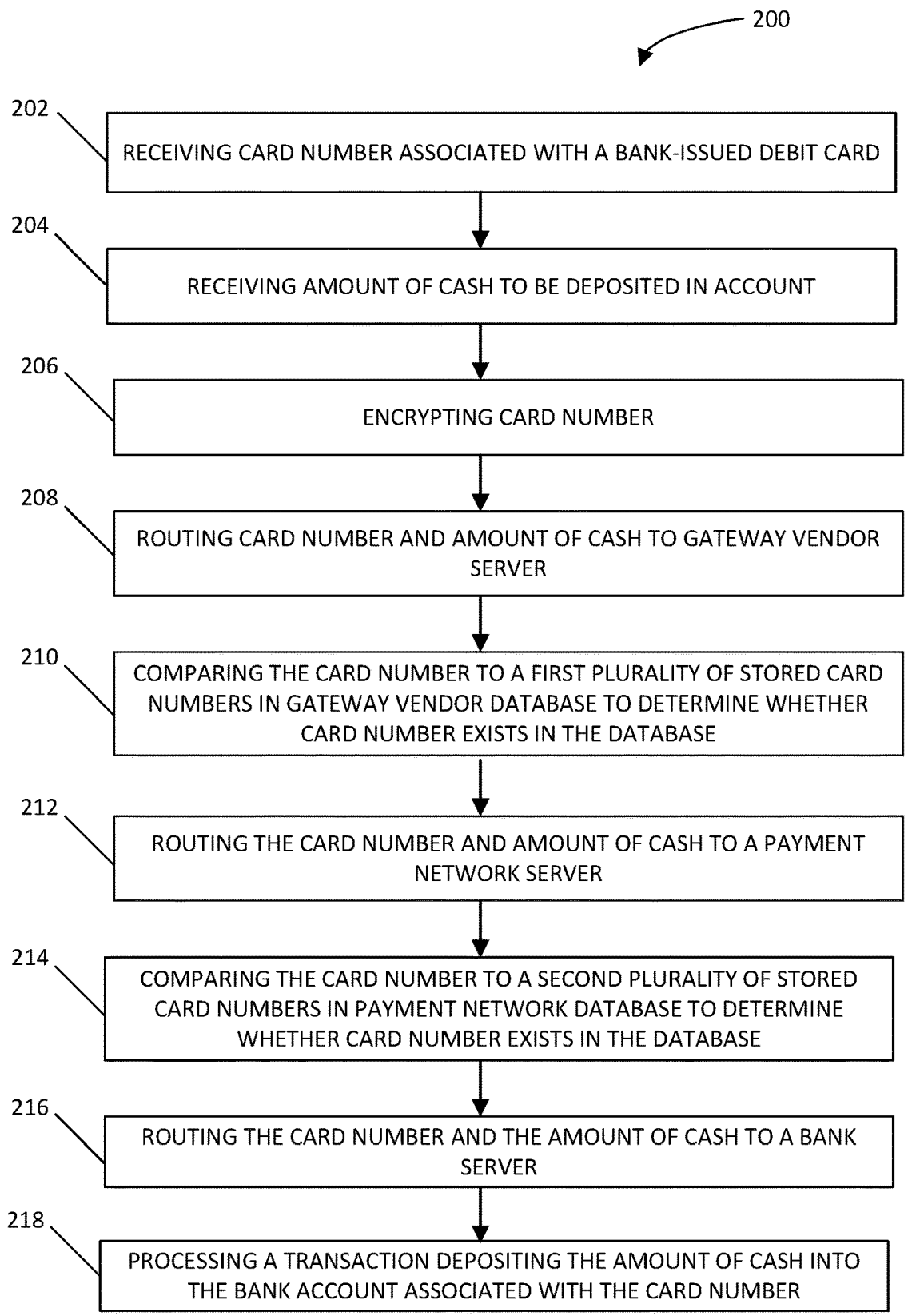
FIG. 2 is a flowchart showing an example method for depositing cash into a bank account at a point-of-sale terminal, according to an example embodiment.

FIG. 2 is a flowchart showing an example method 200 for depositing cash into a bank account at a POS terminal. The method 200 may be performed using the modules in the cash deposit system 100 shown in FIG. 1.

In operation 202, the POS module 110 receives data indicative of a card number associated with a bank-issued debit card. The debit card is associated with a bank account at a bank that issued the bank-issued debit card. In some embodiments, the data indicative of the card number is received when the bank-issued debit card is swiped or scanned at a POS terminal in a retail store.

In operation 204, the POS module 110 receives data indicative of the amount of cash to be deposited into the bank account associated with the card number. The data indicative of the amount of cash may entered by a user or the cashier operating the POS terminal based on an amount of cash provided at a POS terminal.

In operation 206, the POS module 110 encrypts the data indicative of the card number associated with the bank-issued debit card to provide encrypted data indicative of the card number. The encryption may be performed based on the Payment Card Industry Data Security Standard (PCI DSS) requirements. In other embodiments, the data may be encrypted using any other appropriate data encryption standards and methods. In some embodiments, the data indicative of the amount of cash is also encrypted to provide encrypted data indicative of the amount of cash to deposited into the bank account associated with the card number.

In some embodiments, the POS module 110 compares at least one digit of the card number to a plurality of stored card numbers in a POS database associated with the POS module 110 and/or POS terminal to determine whether the card number exists in the POS database. In response to determining a match between the at least one digit of the card number and a stored card number of the plurality of stored card numbers, the POS module 110 retrieves data indicative of a gateway vendor corresponding to the card number from the POS database.

In operation 208, the POS module 110 routes the encrypted data indicative of the card number and the data indicative of the amount of cash to a gateway vendor server. The routing is defined based on at least one digit of the card number. In some embodiments, the card number is routed to a gateway vendor indicated by the data retrieved by the POS module 110 from the POS database, where the data is indicative of a gateway vendor corresponding to the card number.

In some embodiments, the gateway vendor module 120 may be configured to decrypt the data received from the POS module 110 to obtain data indicative of the card number and/or the amount of cash.

In operation 210, the gateway vendor module 120 compares one or more digits of the card number to a first plurality of stored card numbers in a gateway vendor database associated with a gateway vendor server to determine whether the card number exists in the gateway vendor database. In some embodiments, the gateway vendor module 120 may be configured to perform a fraud check based at least in part on the data indicative of the card number, and additional information provided by a user via the POS terminal. A user may be prompted, via the POS terminal, to provide additional information related to the bank account that is associated to the card number. Such information may include, but is not limited to, a name on the account, an address associated with the account, a social security number associated with the account, a PIN number for the account, and the like.

In operation 212, the gateway vendor module 120, in response to determining a match between the card number and a first stored card number of the first plurality of stored card numbers in the gateway vendor database, routes data indicative of the card number and data indicative of the amount of cash to a payment network server. In some embodiments, the data indicative of the card number and data indicative of the amount of cash is routed to the payment network module 130.

In operation 214, the payment network module 130 compares one or more digits of the card number to a second plurality of stored card numbers in a payment network database associated with a payment network server to determine whether the card number exists in the payment network database. In some embodiments, the payment network module 130 may be configured to perform a fraud check based at least in part on the data indicative of the card number, and additional information provided by a user via the POS terminal. A user may be prompted, via the POS terminal, to provide additional information related to the bank account that is associated to the card number. Such information may include, but is not limited to, name on the account, address associated with the account, social security number associated with the account, a PIN number for the account, and the like. The fraud check can also be performed based on past account behavior, for example, a number of deposits made in the account during a period of time, an amount of deposits made in the account, a difference in use of an account as compared to past usage, etc.

In operation 216, the payment network module 130, in response to determining a match between the card number and a second stored card number of the second plurality of stored card numbers in the payment network database, routes data indicative of the card number and data indicative of the amount of cash to a bank server associated with the bank that issued the bank-issued debit card. In some embodiments, the data indicative of the card number and data indicative of the amount of cash is routed to the bank module 140.

In operation 218, the bank module 140 processes a transaction depositing the amount of cash indicated by the data indicative of the amount of cash into the bank account associated with the card number. In some embodiments, the bank module 140 may be configured to perform a fraud check based at least in part on the data indicative of the card number, and additional information provided by a user via the POS terminal. A user may be prompted, via the POS terminal, to provide additional information related to the bank account that is associated to the card number. Such information may include, but is not limited to, name on the account, address associated with the account, social security number associated with the account, a PIN number for the account, and the like. The user may be prompted once to enter such information, and the gateway vendor module 120 and/or the payment network module 130 routes the additional information to the bank module 140 along with the data indicative of the card number and the amount of cash.

Figure 3:
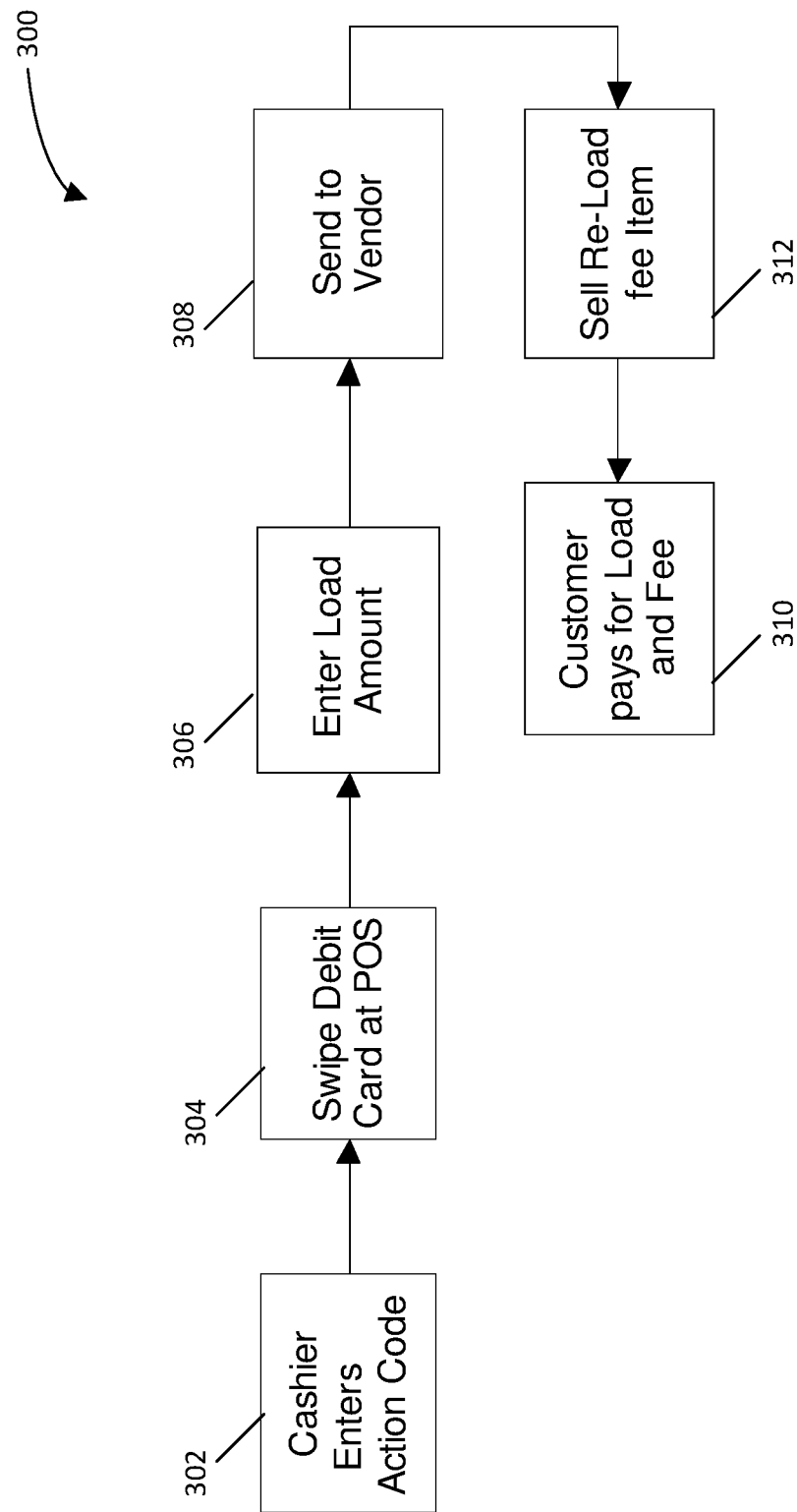
FIG. 3 is a flowchart showing an example method for depositing cash into a bank account at a point-of-sale terminal, according to an example embodiment.

FIG. 3 is a flowchart showing an example method 300 for depositing cash into a bank account at a point-of-sale (POS) terminal. In operation 302, a cashier operating the POS terminal enters an action code in the (computing) system associated with the POS terminal. The system may be programmed to receive a plurality of action codes to perform a variety of transactions at the POS terminal. The cashier may enter a specific action code for depositing cash into a bank account using a debit card associated with the bank account and issued by the bank.

In operation 304, the cashier or the customer swipes the bank-issued debit card at the POS terminal. The debit card may be swiped at a card reader device provided at the POS terminal or the debit card may be scanned by a scanner provided at the POS terminal. In operation 306, the cashier or the customer may enter an amount of cash to be deposited into the bank account associated with the debit card. The amount of cash may be entered via an input interface of the computing system at the POS terminal or via a PIN pad provided at the POS terminal.

In operation 308, the data indicative of the card number and the amount of cash is sent to a third-party vendor. The cashier or the customer may enter 'OK,' based on the accuracy of the information provided by the customer, to send the data to the third-party vendor. In an example embodiment, the third-party vendor processes the data and performs a deposit transaction using the card number and the amount of cash entered at the POS terminal, as described in relation to method 200 shown in FIG. 2.

In some embodiments, there may be a processing fee or transaction fee associated with the cash deposit transaction that is assessed by the retailer where the deposit transaction is initiated. In operation 310, the fee assessed by the bank is communicated to the POS terminal, and displayed on a display interface at the POS terminal for the customer and the cashier to view. The cashier may enter another action code or take appropriate steps so that the customer can pay for the fee. In operation 310, the customer pays for the fee assessed by the bank via the POS terminal.

Figure 4:
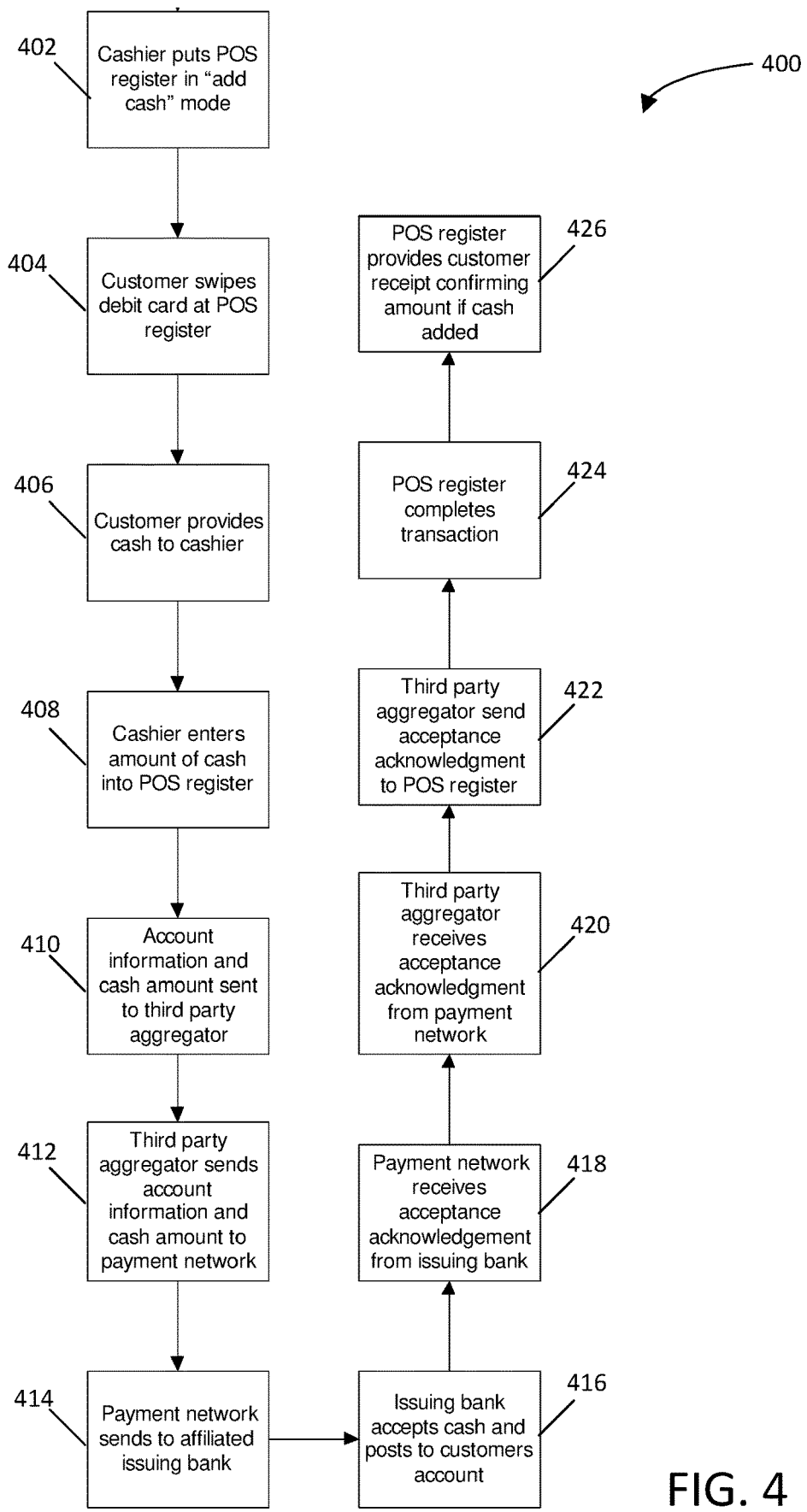
FIG. 4 is a flowchart showing an example method for depositing cash into a bank account at a point-of-sale terminal, according to an example embodiment.

FIG. 4 is a flowchart showing an example method 400 for depositing cash into a bank account at a point-of-sale (POS) terminal. At operation 402, the cashier puts the POS register in "add cash" mode to perform a deposit transaction. At operation 404, the customer swipes or scans his or her bank-issued debit card at the POS terminal via a card reader device or a scanner device. At operation 406, the customer provides an amount of cash to the cashier to be deposited into the bank account associated with the debit card. At operation 408, the cashier enters a number via an input interface of the POS terminal indicating the amount of cash provided by the customer.

At operation 410, data indicative of the account information associated with the swiped debit card is sent to a third party aggregator. Data indicative of the amount of cash is also sent to the third party aggregator, also known as the gateway vendor. At operation 412, the third party aggregator send the received account information and cash amount information to a payment network. The data may be sent to a server associated with the payment network. At operation 414, the payment network sends the account information and the cash amount information to an affiliated bank that issued the debit card swiped at the POS terminal.

At operation 416, the issuing bank accepts the cash and deposits the amount into the customer's bank account that is associated with the debit card swiped at the POS terminal. The issuing bank may perform a fraud check to verify the identity of the customer and the information related to the account. At operation 418, the payment network receives an acknowledgement from the issuing bank indicating acceptance of the deposit transaction by the bank. At operation 420, the third party aggregator receives an acknowledgment from the payment network indicating acceptance of the deposit transaction by the bank. At operation 422, the third party aggregator sends an acknowledgment to the POS terminal indicating acceptance of the deposit transaction by the issuing bank.

At operation 424, the POS terminal completes the transaction by updating records to indicate cash received by the POS terminal. At operation 426, the POS terminal displays a receipt to the customer confirming the amount of cash to be deposited into the account. In some embodiments, at operation 426, the POS terminal displays the total balance in the bank account associated with the debit card after the deposit transaction is performed. In some embodiments, the issuing bank and the retail store where the POS terminal is located settles the accounts for the deposit transaction.

Figure 5:
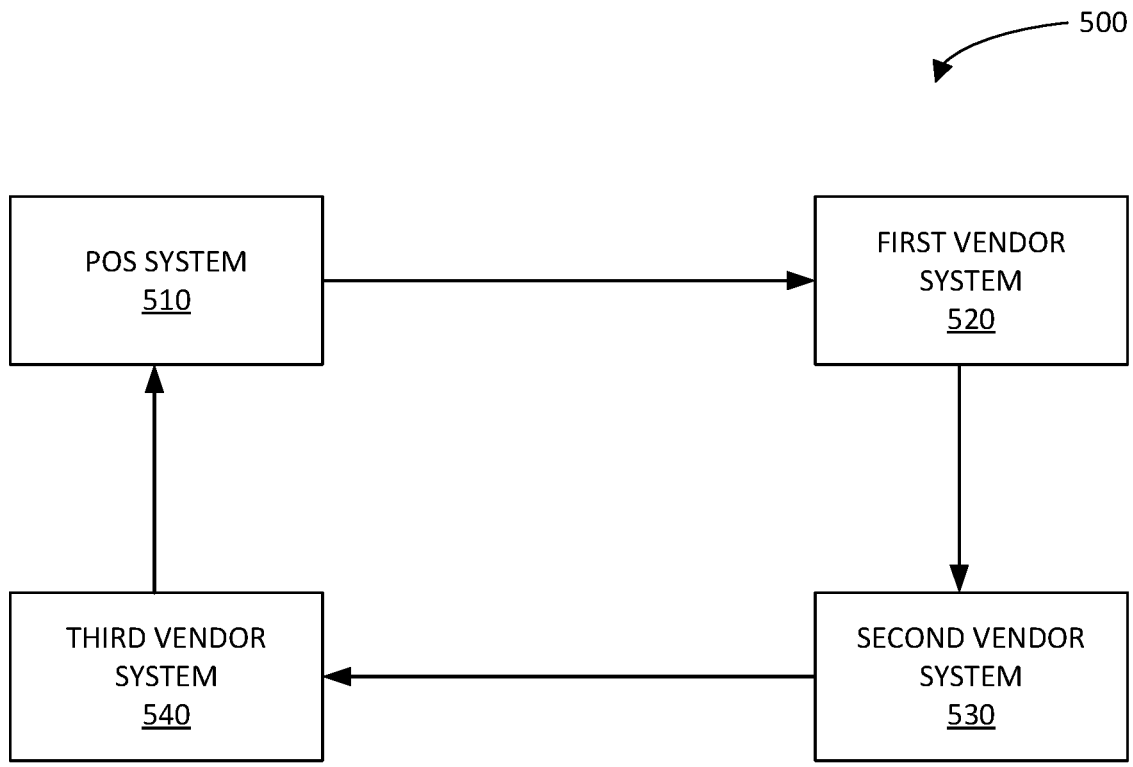
FIG. 5 is a block diagram illustrating an example cash deposit system, according to an example embodiment.

FIG. 5 is a block diagram illustrating an example cash deposit system 500. The example cash deposit system 500 includes a point-of-sale (POS) system 510, a first vendor system 520, a second vendor system 530, and a third vendor system 540. Even though FIG. 5 depicts four systems, the cash deposit system 500 may include fewer or more than four systems to perform the functionalities described herein.

The POS system 510 may be located at the retail store or may be associated with the retail store where the deposit transaction is initiated. The POS system 510 may include the one or more components of the POS terminal where the bank-issued debit card is swiped or scanned. The POS system 510 may also include one or more computing devices, databases and/or servers located at the retail store or associated with the retail store.

The first vendor system 520 may be located at a gateway vendor or may be associated with the gateway vendor corresponding to the card number on the bank-issued debit card. The first vendor system 520 may include one or more computing devices, databases and/or servers located at the gateway vendor or associated with the gateway vendor.

The second vendor system 530 may be located at a payment network vendor or may be associated with the payment network vendor corresponding to the card number on the bank-issued debit card. The second vendor system 530 may include one or more computing devices, databases and/or servers located at the payment network vendor or associated with the payment network vendor.

The third vendor system 540 may be located at a bank that issued the debit card or may be associated with the issuing bank. The third vendor system 540 may include one or more computing devices, databases and/or servers located at the issuing bank or associated with the issuing bank.

Figure 6:
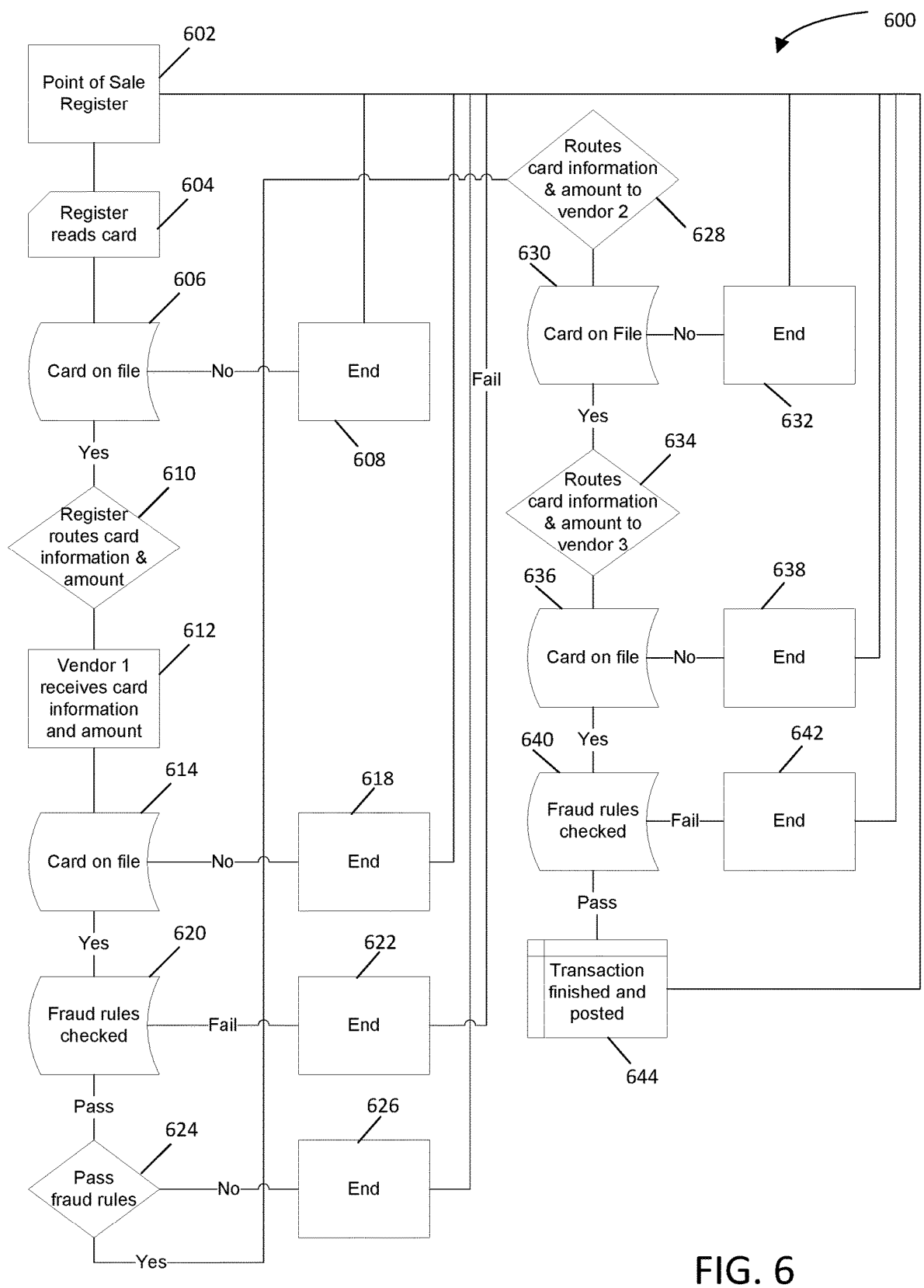
FIG. 6 is a flowchart showing an example method for depositing cash into a bank account at a point-of-sale terminal, according to an example embodiment.

FIG. 6 is a flowchart showing an example method 600 for depositing cash into a bank account at a point-of-sale (POS) terminal. The method 600 may be performed via the cash deposit system 500 described in relation to FIG. 5. In other embodiments, the method 600 may be performed via the cash deposit system 100 described in relation to FIG. 1 or the network system 700 described in relation to FIG. 7.

At block 602, the cashier logs on to the POS terminal or activates the POS terminal for a deposit transaction. At block 604, the POS terminal reads a bank-issued debit card, for example, via a card reader device or a scanning device provided at the POS terminal. At block 606, the POS system 510 determines whether the card number associated with the swiped debit card is 'on file,' that is, the card number is stored in the retail store's records. The POS system 510 determines whether the card number is on file by comparing one or more digits of the card number to a plurality of stored card numbers in one or more databases associated with the POS system 510. In some embodiments, the POS system 510 compares 6 or more, including up to 10 or more, digits of the card number to determine whether the card number is on file. The databases may store information related to card numbers for a plurality of bank-issued debit cards that are available to participate in the cash deposit system at the retail store. The databases may also store information related to third-party vendors (that aid in completing transactions) corresponding to each of the plurality of debit card numbers. If the card number is not found in the databases associated with the POS system 510, then the method proceeds to block 608. At block 608, the method 600 ends, and indication of the end of the process is communicated to the POS terminal (at block 602).

If the card number is on file, and is found in the databases associated with the POS system 510, then the method 600 continues to block 610. At block 610, the POS system 510 routes the card number information and cash amount information to a first third-party vendor corresponding to the card number.

At block 612, the first third-party vendor receives the card number information and the cash amount information at the first vendor system 520. Based on the received information, the first vendor system 520 (at block 614) determines whether the card number is on file. That is, the first vendor system 520 compares the card number to a plurality of card numbers stored in databases associated with the first vendor system 520. If the card number is not found in the databases associated with the first vendor system 520, then the method proceeds to block 618. At block 618, the method 600 ends, and indication of the end of the process is communicated to the POS terminal (at block 602).

If the card number is on file, and is found in the databases associated with the first vendor system 520, then the method 600 continues to block 620. At block 620, the first vendor system 520 performs a fraud check to verify that a fraudulent transaction is not being attempted. The fraud check may verify the identity of the user in possession of the debit card, and may verify that the debit card was not reported to be stolen or lost. The fraud check may also verify account information, and the validity of the account information. If the fraud check fails, then the method ends at block 622, and an indication of the end of the process is communicated to the POS terminal (at block 602).

If the fraud check passes, then the method 600 proceeds to block 624. At block 624, the first vendor system 520 verifies that all of the fraud rules were passed. If all of the fraud rules were not passed, then the method ends at block 626, an indication of the end of the process is communicated to the POS terminal (at block 602).

If all of the fraud rules received a pass flag at block 624, then the method 600 proceeds to block 628. At block 628, the first vendor system 520 routes the card number information and cash amount information to a second third-party vendor corresponding to the card number.

At block 628, the second third-party vendor receives the card number information and the cash amount information at the second vendor system 530. Based on the received information, the second vendor system 530 (at block 630) determines whether the card number is on file. That is, the second vendor system 530 compares the card number to a plurality of card numbers stored in databases associated with the second vendor system 530. If the card number is not found in the databases associated with the second vendor system 530, then the method proceeds to block 632. At block 632, the method 600 ends, and an indication of the end of the process is communicated to the POS terminal (at block 602).

If the card number is on file, and is found in the databases associated with the second vendor system 530, then the method 600 continues to block 634. At block 634, the second vendor system 530 routes the card number information and cash amount information to a third third-party vendor corresponding to the card number.

At block 634, the third vendor system 540 receives the card information and cash amount information. Based on the received information, the third vendor system 540 (at block 638) determines whether the card number is on file. That is, the third vendor system 540 compares the card number to a plurality of card numbers stored in databases associated with the third vendor system 540. If the card number is not found in the databases associated with the third vendor system 540, then the method proceeds to block 638. At block 638, the method 600 ends, and an indication of the end of the process is communicated to the POS terminal (at block 602).

If the card number is on file, and is found in the databases associated with the third vendor system 540, then the method 600 continues to block 640. At block 640, the third vendor system 540 performs a fraud check to verify that a fraudulent transaction is not being attempted. The fraud check may verify the identity of the user in possession of the debit card, and may verify that the debit card was not reported to be stolen or lost. The fraud check may also verify account information, and the validity of the account information. If the fraud check fails, then the method ends at block 642, and an indication of the end of the process is communicated to the POS terminal (at block 602).

If the fraud check passes, then the method 600 proceeds to block 644. At block 644, the third vendor system 540 completes the deposit transaction, and posts the transaction to the bank account associated with the debit card read by the POS terminal at block 604. At block 644, the third vendor system 540 also communicates an indication of the completion of the transaction to the POS terminal.

In this manner, the systems and methods described herein provide for depositing cash into a bank account at a point-of-sale terminal in a retail store via the cash deposit system. The cash deposit system enables customers with existing bank accounts and debit cards issued by the bank to deposit money into their bank accounts via a retail store's POS terminal. The customer can swipe his or her bank-issued debit card at the POS terminal to initiate the deposit transaction with the issuing bank. The cash deposit system routes card and cash amount information provided at the POS terminal to third-party vendors to complete the deposit transaction. The information is routed based on the card number. The cash deposit system allows customers to skip a trip to their banks, and enables them to deposit money while they are at the retail store.

Additionally, many banks and financial institutions do not have physical branches that are conveniently located for the customers. In this case, the bank or financial institution can benefit from the cash deposit system described herein by offering services to its customer via a conveniently located retail store.

Figure 7:
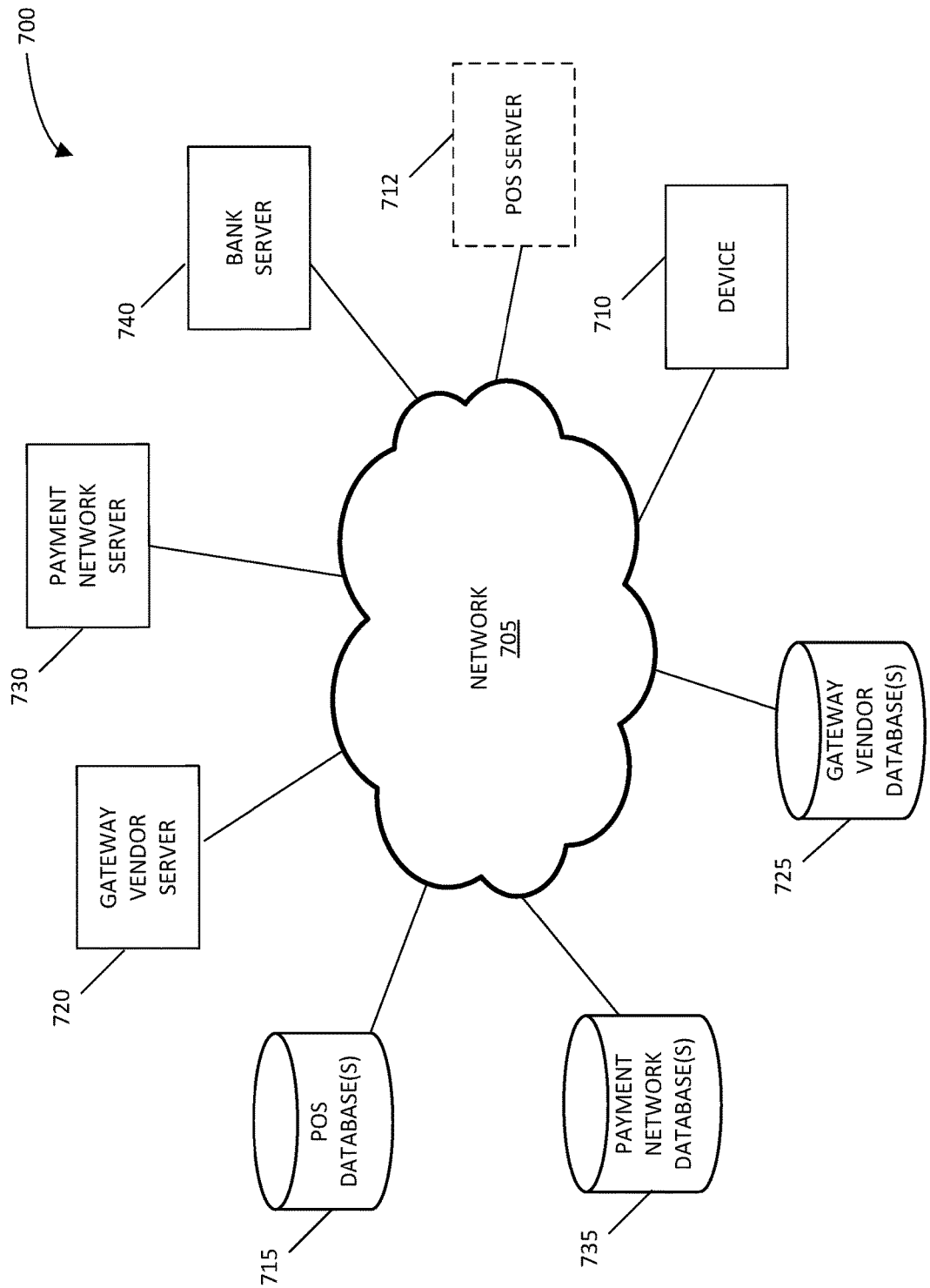
FIG. 7 illustrates a network diagram depicting a system for implementing the cash deposit system, according to an example embodiment.

FIG. 7 illustrates a network diagram depicting a system 700 for implementing the cash deposit system, according to an example embodiment. The system 700 can include a network 705, a device 710, multiple servers, for example, gateway vendor server 720, payment network server 730, bank server 740, and multiple databases, for example, POS database(s) 715, gateway vendor database(s) 725, and payment network database(s). Each of the device 710, servers 720, 730, 740, and databases 715, 725, 735 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 710 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The device 710 may include some or all components described in relation to computing device 800 shown in FIG. 8.

In some embodiments, the device 710 is a POS system. In this case, the device 710, being a POS system, may comprise, but is not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. The device 710, being a POS system, is part of a store infrastructure and aids in performing various transactions related to sales and other aspects of a store. Being part of a store's infrastructure, the device 710 as a POS system may be installed within the store or they may be installed or operational outside of the store. For example, the device 710 may be a mobile device that a store employee can use outside of the store to perform transactions or other activities. In another example, the device 710 may be a kiosk installed outside the store. Similarly, the device 710 may be a mobile device that can be used within the store, and is not physically installed or attached to one particular location within the store.

The device 710 as a POS system may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

The device 710 may connect to network 705 via a wired or wireless connection. The device 710 may include one or more applications such as, but not limited to, a web browser, a sales transaction application, a card reader application, cash deposit system, and the like. In an example embodiment, the device 710 may perform all the functionalities described herein.

In other embodiments, the cash deposit system may be included on the device 710, and the servers 720, 730, 740 performs the functionalities described herein. In yet another embodiment, the device 710 may perform some of the functionalities, and servers 720, 730, 740 performs the other functionalities described herein.

Each of the databases 715, 725, 735, and servers 720, 730, 740 is connected to the network 705 via a wired connection. Alternatively, one or more of the databases 715, 725, 735, and servers 720, 730, 740 may be connected to the network 705 via a wireless connection. Although not shown, server 720, 730, 740 can be (directly) connected to the database(s) 715, 725, 735. Servers 720, 730, 740 comprises one or more computers or processors configured to communicate with device 710 via network 705. Servers 720, 730, 740 hosts one or more applications or websites accessed by device 710 and/or facilitates access to the content of database(s) 715, 725, 735. Servers 720, 730, 740 may include one or more components described in relation to system 100 shown in FIG. 1. Database(s) 715, 725, 735 comprise one or more storage devices for storing data and/or instructions (or code) for use by servers 720, 730, 740, and/or device 710. Database(s) 715, 725, 735, and/or servers 720, 730, 740, may be located at one or more geographically distributed locations from each other or from device 710. Alternatively, database(s) 715, 725, 735 may be included within servers 720, 730, 740.

Figure 8:
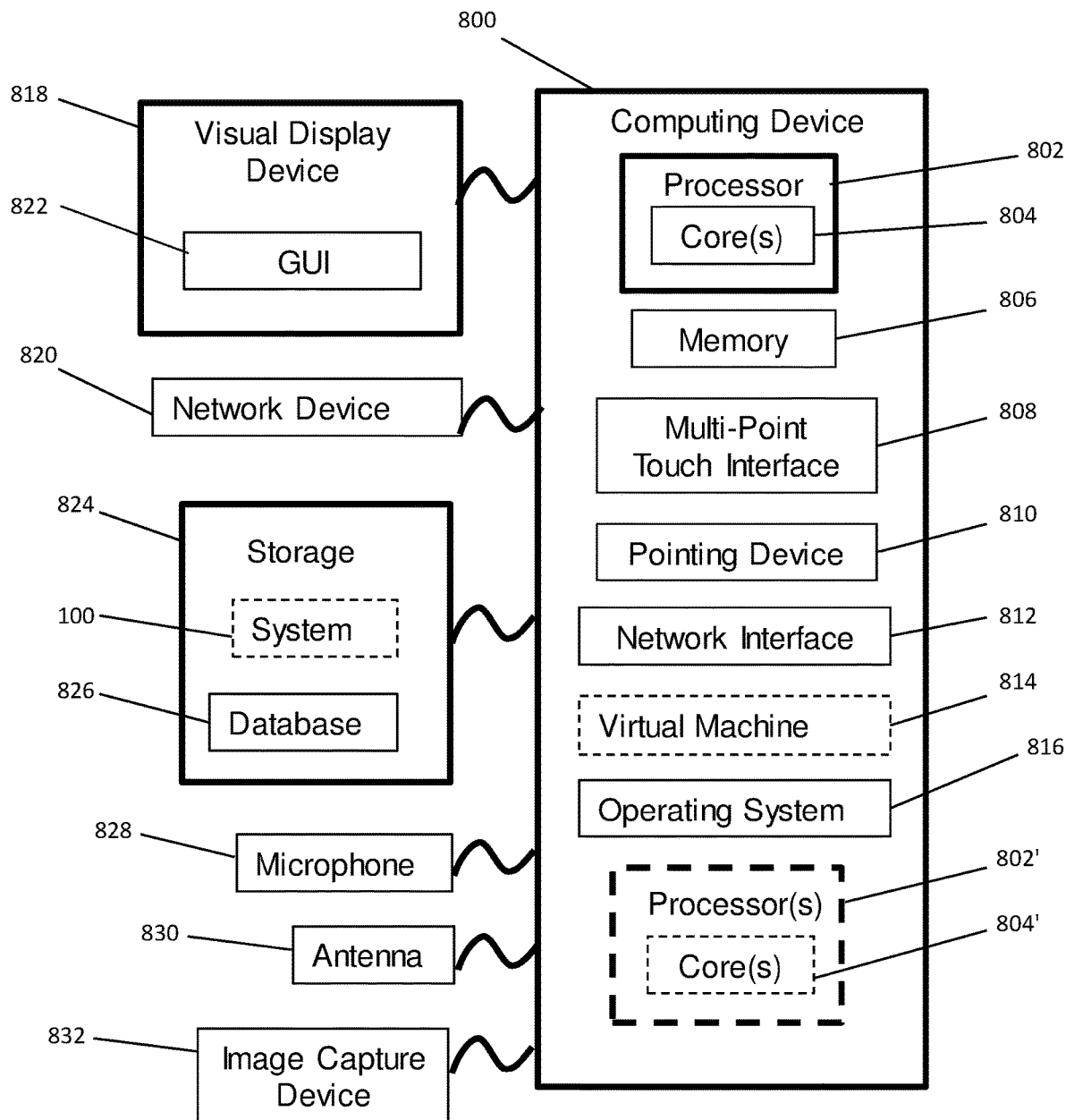
FIG. 8 is a block diagram of an exemplary computing device that may be used to implement exemplary embodiments of the cash deposit system described herein.

FIG. 8 is a block diagram of an exemplary computing device 800 that may be used to implement exemplary embodiments of the cash deposit system 100 described herein. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the cash deposit system 100. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through a visual display device 818, such as a computer monitor, which may display one or more graphical user interfaces 822 that may be provided in accordance with exemplary embodiments. The computing device 800 may include other I/O devices for receiving input from a user, for example, a keyboard or any suitable multi-point touch interface 808, a pointing device 810 (e.g., a mouse), a microphone 828, and/or an image capturing device 832 (e.g., a camera or scanner). The multi-point touch interface 808 (e.g., keyboard, pin pad, scanner, touch-screen, etc.) and the pointing device 810 (e.g., mouse, stylus pen, etc.) may be coupled to the visual display device 818. The computing device 800 may include other suitable conventional I/O peripherals.

The computing device 800 may also include one or more storage devices 824, such as a hard-drive, CD-ROM, or other computer readable media, for storing data and computer-readable instructions and/or software that implement exemplary embodiments of the cash deposit system 100 described herein. Exemplary storage device 824 may also store one or more databases for storing any suitable information required to implement exemplary embodiments. For example, exemplary storage device 824 can store one or more databases 826 for storing information, such bank-issued debit card numbers, bank account information, account holder information, and/or any other information to be used by embodiments of the system 100. The databases may be updated manually or automatically at any suitable time to add, delete, and/or update one or more items in the databases.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 800 can include one or more antennas 830 to facilitate wireless communication (e.g., via the network interface) between the computing device 800 and a network. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 800 may run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for remote deposit access, the method comprising:
    providing a point of sale device associated with a retail store and configured to permit a customer to complete a checkout transaction to purchase one or more retail items from the retail store and to permit the customer to deposit cash into a bank account of the customer;
    in response to a cashier of the point of sale device entering a first action code for depositing the cash into the point of sale device, enabling the point of sale device to process a cash deposit transaction, where the cash is deposited into the bank account of the customer;
    after the enabling of the point of sale device to process the cash deposit transaction by way of the entering of the first action code to enable by the cashier of the point of sale device:
        receiving, at the point of sale device, data indicative of a card number associated with a bank-issued debit card of the customer, the debit card being associated with a bank account of the customer at a bank that issued the bank-issued debit card of the customer;
        receiving, at the point of sale device, data indicative of the amount of cash to be deposited into the bank account of the customer associated with the bank-issued debit card of the customer based on an amount of cash provided at the point of sale device;
        identifying with the point of sale device a gateway vendor server that provides connectivity to multiple endpoints for processing financial transactions and facilitates a secure connection between the point of sale device, a payment network server that provides processing services for the financial transactions, and a bank server associated with the bank that issued the debit card of the customer, the gateway vendor server being identified based on at least some digits of the card number;
        encrypting the data indicative of the card number associated with the bank-issued debit card of the customer to provide encrypted data indicative of the card number;
        obtaining at the point of sale device a cash deposit processing fee assessed by the bank that issued the bank-issued debit card of the customer for permitting the customer, after the entering of the first action code by the cashier of the point of sale device and the enabling of the point of sale device to process the cash deposit transaction, to make the cash deposit into the bank account of the customer associated with the bank-issued debit card of the customer;
        displaying to the customer on a display associated with the point of sale device an amount indicating the cash deposit processing fee assessed by the bank;
        in response to the cashier of the point of sale device entering a second action code for paying the cash deposit processing fee into the point of sale device, enabling the point of sale device to permit the customer to enter, via the point of sale device, a payment covering the cash deposit processing fee assessed by the bank for permitting the customer to make the cash deposit into the bank account of the customer associated with the bank-issued debit card of the customer;
        following a receipt of the payment from the customer covering the cash deposit processing fee assessed by the bank, routing, via the point of sale device, the encrypted data indicative of the card number and the data indicative of the amount of cash from the point of sale device to the gateway vendor server, wherein the gateway vendor server routes the encrypted data indicative of the card number and the data indicative of the amount of cash to the payment network server, and wherein the payment network server routes the data indicative of the amount of cash to the bank server to deposit the amount of cash indicated by the data into the bank account of the customer at the bank associated with the debit card number of the customer;
        receiving at the point of sale device an acknowledgement of the amount of deposit in the bank account of the customer; and
        displaying to the customer on a display associated with the point of sale device a confirmation of the amount of cash deposited into the bank account of the customer following receipt of the acknowledgement.

2. The method of claim 1, wherein the card number is received at the point of sale device when the bank-issued debit card is swiped or scanned at the point of sale device.

3. The method of claim 1, wherein a fraud check is performed by the gateway vendor server based at least in part on information provided by the customer at the point of sale device.

4. The method of claim 1, wherein a fraud check is performed by the payment network server based at least in part on information provided by the customer at the point of sale device.

5. The method of claim 1, wherein a fraud check is performed by a bank server based at least in part on information provided by the customer at the point of sale device.

6. The method of claim 1, further comprising:
    comparing, at the point of sale device, the at least one digit of the card number to a plurality of stored card numbers in a point of sale device database associated with the point of sale device to determine whether the card number exists in the point of sale device database;
    in response to determining a match between the at least one digit of the card number and a stored card number of the plurality of stored card numbers, retrieving data indicative of a gateway vendor corresponding to the card number from the point of sale device database; and
    routing the card number and the data indicative of the amount of cash to a gateway vendor server associated with the retrieved gateway vendor;
    wherein the routing is defined based on at least one digit of the card number.

7. A system for remote deposit access, the system comprising:
    a point of sale device associated with a retail store and configured to permit a customer to complete a checkout transaction to purchase one or more retail items from the retail store, the point of sale device equipped with one or more processors and configured to receive a first action code input from a cashier of the point of sale device for depositing cash into the point of sale device to enable the point of sale device to process a cash deposit transaction, and after the first action code is entered by the cashier of the point of sale device to enable the point of sale to process the cash deposit transaction, to execute a module that when executed:

receives data indicative of a card number associated with a bank-issued debit card of the customer, the debit card being associated with a bank account of the customer at a bank that issued the bank-issued debit card of the customer;

receives an amount of cash to be deposited into the bank account of the customer associated with the bank-issued debit card of the customer based on an amount of cash provided by the customer at the point of sale device;

identifies with the point of sale device a gateway vendor server that provides connectivity to multiple endpoints for processing financial transactions and facilitates a secure connection between the point of sale device, a payment network server that provides processing services for the financial transactions, and a bank server associated with the bank that issued the debit card of the customer, the gateway vendor server being identified based on at least some digits of the card number;

encrypts the data indicative of the card number associated with the bank-issued debit card of the customer to provide encrypted data indicative of the card number;

obtains at the point of sale device a cash deposit processing fee assessed by the bank that issued the bank-issued debit card of the customer for permitting the customer, after the first action code is entered by the cashier of the point of sale device to enable the point of sale device to process the cash deposit transaction, to make the cash deposit into the bank account of the customer associated with the bank-issued debit card of the customer;

displays to the customer on a display associated with the point of sale device an amount indicating the cash deposit processing fee assessed by the bank;

in response to receipt of a second action code input by the cashier of the point of sale device for paying the cash deposit processing fee into the point of sale device, permits the customer to enter, via the point of sale device, a payment covering the cash deposit processing fee assessed by the bank for permitting the customer to make the cash deposit into the bank account of the customer associated with the bank-issued debit card of the customer;

following a receipt of the payment from the customer covering the cash deposit processing fee assessed by the bank, routes the encrypted data indicative of the card number and data indicative of the amount of cash from the point of sale device to the gateway vendor server, wherein the gateway vendor server routes the encrypted data indicative of the card number and the data indicative of the amount of cash to the payment network server, and wherein the payment network server routes the data indicative of the amount of cash to the bank server to deposit the amount of cash indicated by the data into the bank account of the customer at the bank associated with the debit card number of the customer;

receives at the point of sale device an acknowledgement of the amount of deposit in the bank account of the customer; and displays to the customer on a display associated with the point of sale device a confirmation of the amount of cash deposited into the bank account of the customer following receipt of the acknowledgement.

8. The system of claim 7, wherein the card number is received at the point of sale device when the debit card is swiped or scanned at the point of sale device.

9. The system of claim 7, wherein a fraud check is performed by the gateway vendor server based at least in part on information provided by the customer at the point of sale device.

10. The system of claim 7, wherein a fraud check is performed by the payment network server based at least in part on information provided by the customer at the point of sale device.

11. The system of claim 7, wherein a fraud check is performed by a bank server based at least in part on information provided by the customer at the point of sale device, and/or past transactions to the bank account of the customer.

12. The system of claim 7, wherein the point of sale device module is further configured to:

compare the at least one digit of the card number to a plurality of stored card numbers in a point of sale device database associated with the point of sale device to determine whether the card number exists in the point of sale device database;

in response to determining a match between the at least one digit of the card number and a stored card number of the plurality of stored card numbers, retrieve data indicative of a gateway vendor corresponding to the card number from the point of sale device database; and route the card number and the data indicative of the amount of cash to a gateway vendor server associated with the retrieved gateway vendor, wherein the routing is based on at least one digit of the card number.

13. A non-transitory machine readable medium storing instructions executable by a processing device, wherein execution of the instructions causes the processing device to implement a method, the method comprising:

providing a point of sale device associated with a retail store and configured to permit a customer to complete a checkout transaction to purchase one or more retail items from the retail store and to permit the customer to deposit cash into a bank account of the customer;

in response to a cashier of the point of sale device entering a first action code for depositing the cash into the point of sale device, enabling the point of sale device to process a cash deposit transaction, where the cash is deposited into the bank account of the customer;

after the enabling of the point of sale device to process the cash deposit transaction by way of the entering of the first action code by the cashier of the point of sale device:

receiving, at the point of sale device, data indicative of a card number associated with a bank-issued debit card of the customer, the debit card being associated with a bank account of the customer at a bank that issued the bank-issued debit card of the customer;

receiving, at the point of sale device, data indicative of the amount of cash to be deposited into the bank account of the customer associated with the bank-issued debit card of the customer based on an amount of cash provided at the point of sale device;

identifying with the point of sale device a gateway vendor server that provides connectivity to multiple endpoints for processing financial transactions and facilitates a secure connection between the point of sale device, a payment network server that provides processing services for the financial transactions, and a bank server associated with the bank that issued the debit card of the customer, the gateway vendor server being identified based on at least some digits of the card number;

encrypting the data indicative of the card number associated with the bank-issued debit card of the customer to provide encrypted data indicative of the card number;

obtaining at the point of sale device a cash deposit processing fee assessed by the bank that issued the bank-issued debit card of the customer for permitting the customer, after the entering of the first action code by the cashier of the point of sale device and the enabling of the point of sale device to process the cash deposit transaction, to make the cash deposit into the bank account of the customer associated with the bank-issued debit card of the customer;

displaying to the customer on a display associated with the point of sale device an amount indicating the cash deposit processing fee assessed by the bank;

in response to the cashier of the point of sale device entering a second action code for paying the cash deposit processing fee into the point of sale device, enabling the point of sale device to permit the customer to enter, via the point of sale device, a payment covering the cash deposit processing fee assessed by the bank for permitting the customer to make the cash deposit into the bank account of the customer associated with the bank-issued debit card of the customer;

following a receipt of the payment from the customer covering the cash deposit processing fee assessed by the bank, routing, via the point of sale device, the encrypted data indicative of the card number and the data indicative of the amount of cash from the point of sale device to the gateway vendor server, wherein the gateway vendor server routes the encrypted data indicative of the card number and the data indicative of the amount of cash to the payment network server, and wherein the payment network server routes the data indicative of the amount of cash to the bank server to deposit the amount of cash indicated by the data into the bank account of the customer at the bank associated with the debit card number of the customer;

receiving at the point of sale device an acknowledgement of the amount of deposit in the bank account of the customer; and displaying to the customer on a display associated with the point of sale device a confirmation of the amount of cash deposited into the bank account of the customer following receipt of the acknowledgement.

14. The non-transitory computer readable medium of claim 13, wherein the card number is received at the point of sale device when the debit card is swiped or scanned at the point of sale device.

15. The non-transitory computer readable medium of claim 13, wherein a fraud check is performed by the gateway vendor server based at least in part on information provided by the customer at the point of sale device.

16. The non-transitory computer readable medium of claim 13, wherein a fraud check is performed by the payment network server based at least in part on information provided by the customer at the point of sale device.

17. The non-transitory computer readable medium of claim 13, wherein a fraud check is performed by the bank server based at least in part on information provided by the customer at the point of sale device, and/or past transactions to the bank account of the customer.

18. The non-transitory computer readable medium of claim 13, wherein execution of the instructions further causes the processing device to:

compare, at the point of sale device, the at least one digit of the card number to a plurality of stored card numbers in a point of sale device database associated with the point of sale device to determine whether the card number exists in the point of sale device database;

in response to determining a match between the at least one digit of the card number and a stored card number of the plurality of stored card numbers, retrieve data indicative of a gateway vendor corresponding to the card number from the point of sale device database; and route the card number and the data indicative of the amount of cash to a gateway vendor server associated with the retrieved gateway vendor, wherein the routing is based on at least one digit of the card number.

* * * * *

UNITED STATES PATENT AND TRADEMARK OFFICE
CERTIFICATE OF CORRECTION

PATENT NO. : 11,556,905 B2
APPLICATION NO. : 15/188001
DATED : January 17, 2023
INVENTOR(S) : Charles D. Berry and Timothy Webb It is certified that error appears in the above-identified patent and that said Letters Patent is hereby corrected as shown below:

In the Claims

In Column 15, Claim 1, Line 28, delete "to enable.".

In Column 20, Claim 14, Line 13, delete "computer readable" and insert -- machine readable --, therefor.

In Column 20, Claim 15, Line 17, delete "computer readable" and insert -- machine readable --, therefor.

In Column 20, Claim 16, Line 21, delete "computer readable" and insert -- machine readable --, therefor.

In Column 20, Claim 17, Line 25, delete "computer readable" and insert -- machine readable --, therefor.

In Column 20, Claim 18, Line 30, delete "computer readable" and insert -- machine readable --, therefor.

Signed and Sealed this
Nineteenth Day of September, 2023

Katherine Kelly Vidal
*Director of the United States Patent and Trademark Office*